(12) United States Patent
Blouin et al.

(10) Patent No.: US 12,379,389 B2
(45) Date of Patent: Aug. 5, 2025

(54) APPARATUS AND METHOD FOR FLUID-SCREW SYSTEM PROPERTY MEASUREMENT

(71) Applicant: Tyto Robotics Inc., Gatineau (CA)

(72) Inventors: Charles Blouin, Gatineau (CA); Baiyun Tang, Gatineau (CA); Dominic Robillard, Gatineau (CA)

(73) Assignee: Tyto Robotics Inc., Gatineau (CA)

( * ) Notice: Subject to any disclaimer, the term of this patent is extended or adjusted under 35 U.S.C. 154(b) by 563 days.

(21) Appl. No.: 17/516,963

(22) Filed: Nov. 2, 2021

(65) Prior Publication Data
US 2022/0177128 A1   Jun. 9, 2022

(30) Foreign Application Priority Data
Nov. 3, 2020   (CA) ................................ 3097882

(51) Int. Cl.
  *G01P 1/02*   (2006.01)
  *B64U 30/29*  (2023.01)

(52) U.S. Cl.
  CPC .............. *G01P 1/026* (2013.01); *B64U 30/29* (2023.01)

(58) Field of Classification Search
  CPC .... B64U 2101/30; G01P 1/026; B64C 39/024
  USPC ........................................................ 73/494
  See application file for complete search history.

(56) References Cited

U.S. PATENT DOCUMENTS

| | | | |
|---|---|---|---|
| 4,563,906 A * | 1/1986 | Mathias | G01L 9/0041 73/862.581 |
| 2008/0164698 A1 * | 7/2008 | Habets | G01M 15/14 290/43 |
| 2014/0219796 A1 * | 8/2014 | Caruso | F03D 7/0208 416/9 |

FOREIGN PATENT DOCUMENTS

| | | | | |
|---|---|---|---|---|
| CN | 107806996 A | * | 3/2018 | |
| CN | 108918136 A | * | 11/2018 | G01M 13/023 |

OTHER PUBLICATIONS

Translation of CN-108918136-A (Year: 2018).*
Translation of CN-107806996-A (Year: 2018).*

\* cited by examiner

*Primary Examiner* — Nathaniel T Woodward
(74) *Attorney, Agent, or Firm* — Eugene F. Derenvi; Fogler, Rubinoff LLP

(57) ABSTRACT

Disclosed herein is a sensor mount apparatus for measuring at least one property of a screw-fluid system. A specific device under test is mounted to a mounting base; a sensor unit selectively connected to said mounting base, for measuring at least one of a force load or a moment load transferred to the mounting base; a load limiter is selectively connected to sensor unit, for limiting at least one of the force load or moment load transferred to the sensor unit; and a mounting plate rigidly connected to said load limiter, for mounting the device under test to the apparatus so that any force or moment caused by a thrust or a drag from the device under test flows through the load limiter to the sensor unit whereat the load is selectively measured.

29 Claims, 9 Drawing Sheets

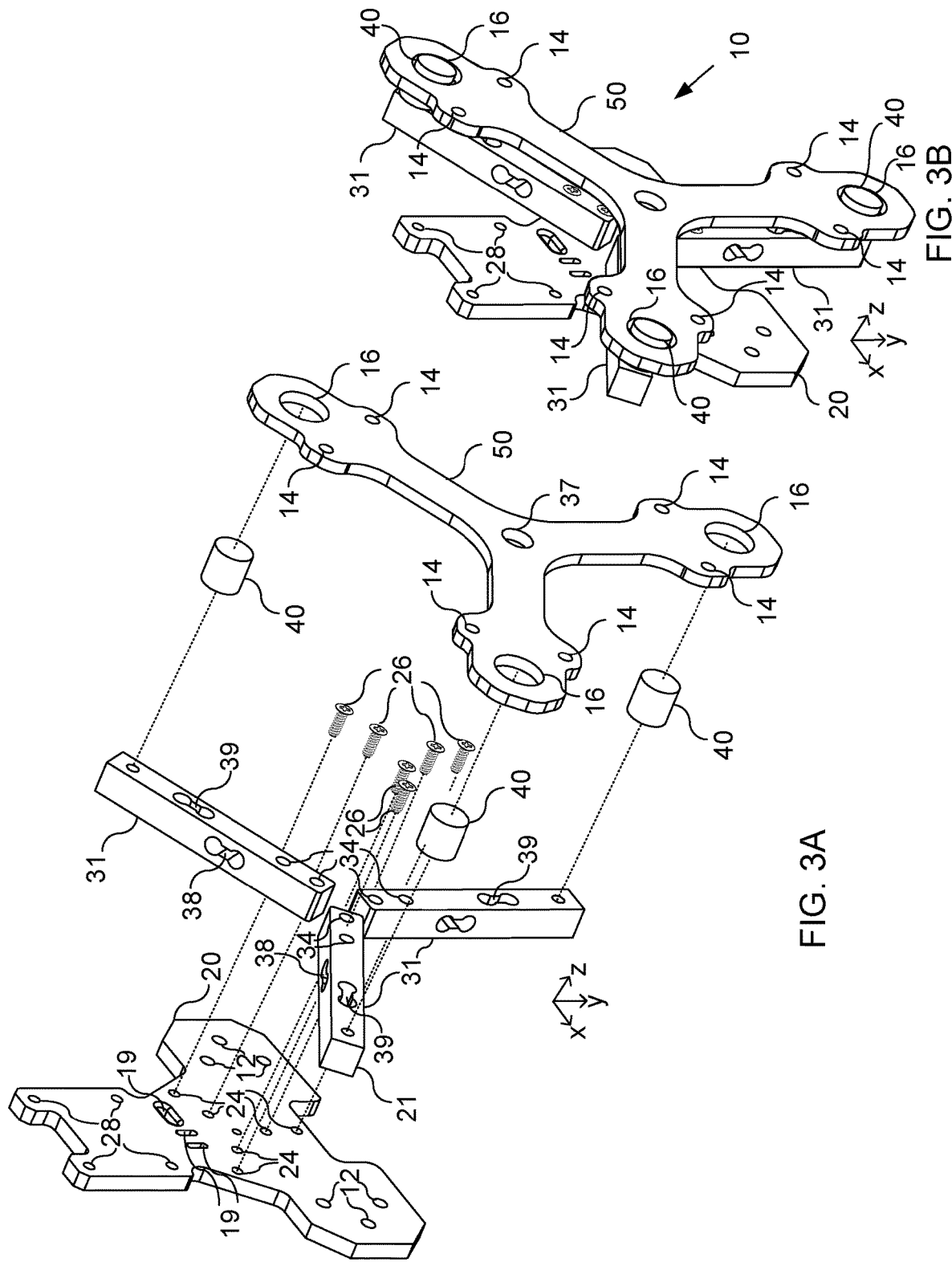

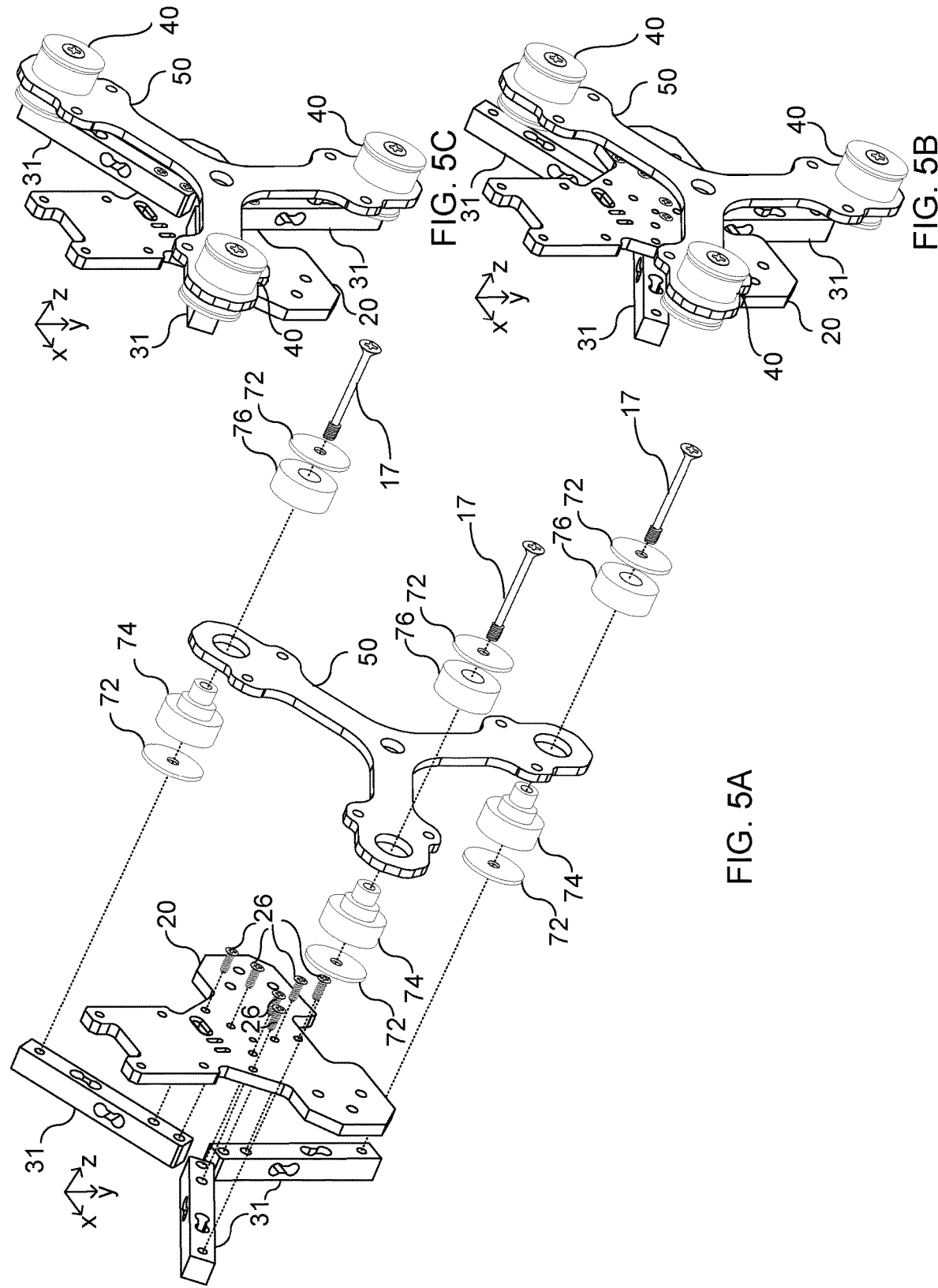

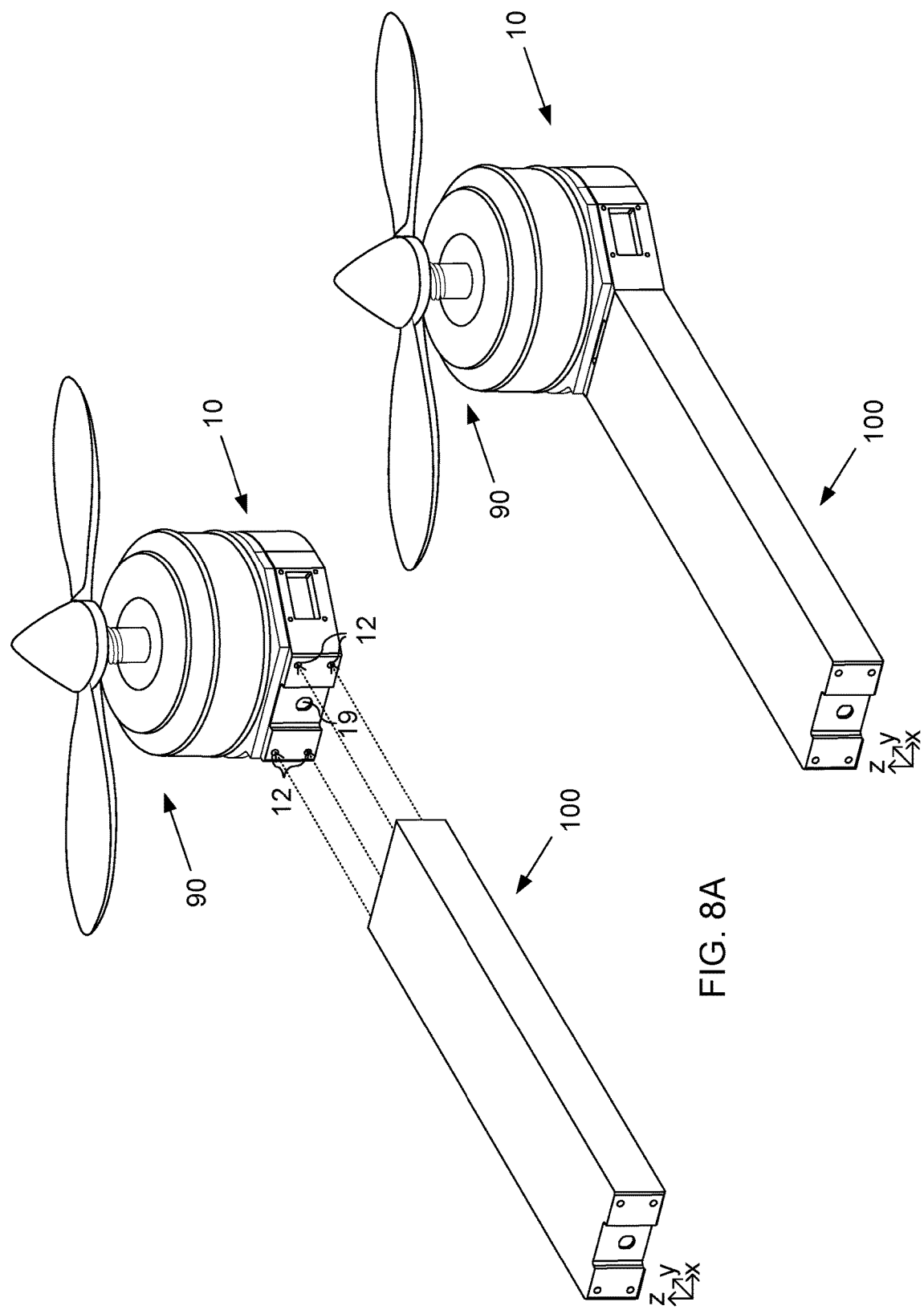

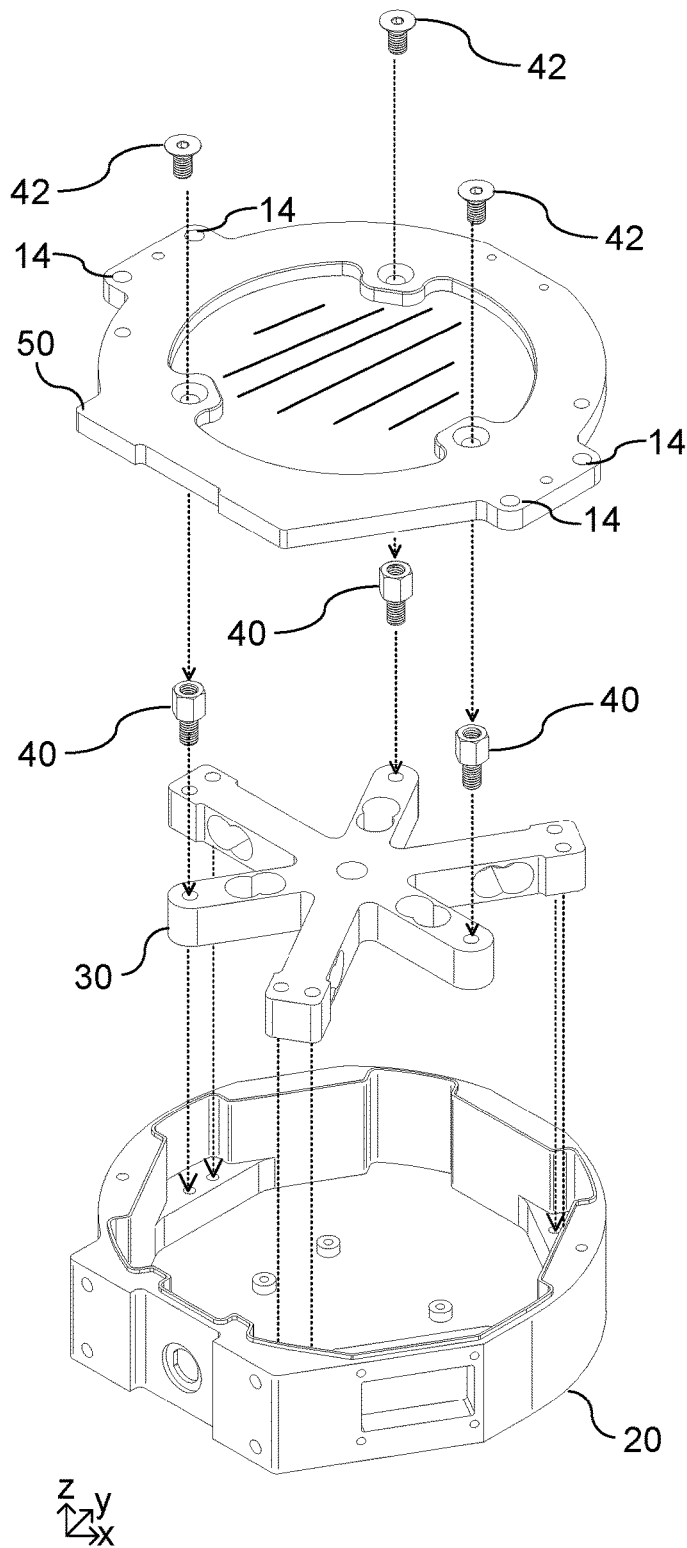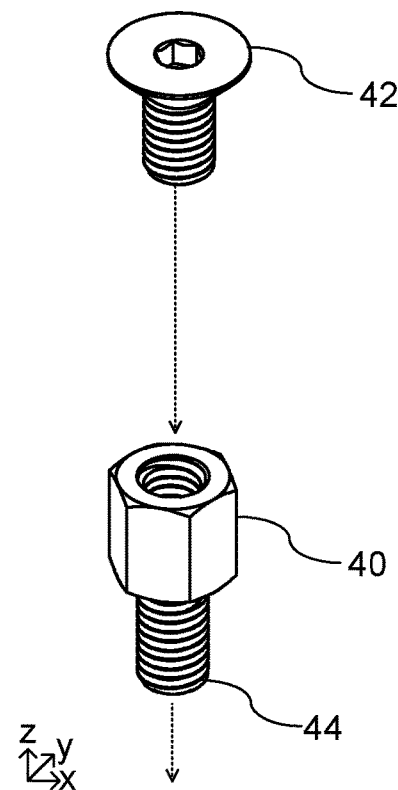
FIG. 9A
FIG. 9B

APPARATUS AND METHOD FOR FLUID-SCREW SYSTEM PROPERTY MEASUREMENT

CROSS-REFERENCE TO RELATED APPLICATIONS

This is the first application filed for the present invention.

TECHNICAL FIELD

This application relates to screw-fluid systems in general, and to an apparatus and method for fluid-screw system property measurement, in particular.

BACKGROUND

Screw-fluid systems in general involve a screw that interacts with a fluid that surrounds it. The types of screw, fluid, and interaction have traditionally been used to differentiate systems in the art, which in fact are all example species of a generic screw-fluid system. Consider the following examples, without limitation. A fan (screw) moves (interaction) air or water (fluid) which surrounds the fan. A propeller (screw) propels (interaction) through air or water (fluid) the object that the propeller is attached to, such as a plane, boat or submersible. A generator turbine (screw) turns (interaction) in response to flow of air or water (fluid) which surrounds the turbine.

In the design of these screw-fluid systems, components and subsystems are often used as a different species of the generic screw-fluid system in order to measure their properties. For example, and without limitation, thrust stands allow optimization of large-scale electric propulsion systems for brushless motors of various power ratings and propellers of various sizes. Test benches using thrust stands can enable Unmanned Aerial Vehicle (UAV) manufacturers to improve flight time, payload capacity, and general UAV performances by supporting thrust measurement (in kgf) and torque measurement (in Nm) using different configurations that can be a function of thrust/torque ratings. In these thrust stands, screw-fluid systems of the propeller species are in effect converted into screw-fluid systems of the fan species, since the thrust stand to which the screw is attached does not interact with the fluid to propel the thrust stand, but instead to move the fluid surrounding it. As UAV technology continues to mature and market demand increases for more advanced UAVs, such as for example UAVs having coaxial (back-to-back or face-to-face) or offset (face-to-face) propeller configurations to maximize thrust while minimizing torque, there is a corresponding need for improvements in thrust stands and test benches uniquely configured so as to enable manufacturers to meet the higher thrust and torque requirements of the components of these UAVs. More generically, there is a need for an improved apparatus and method of screw-fluid system property measurement.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions using the aspects of the present application.

One general aspect includes a sensor mount apparatus for measuring at least one property of a screw-fluid system or components thereof, the components including motors, generators, bearings, shafts, propellers or fans, the apparatus configurable for a specific device under test, the device under test including at least one screw-fluid system component, the apparatus including: means for rigidly fixing the apparatus relative to an x-y plane and a z-axis perpendicular to the x-y plane; means for measuring at least one of a force load or a moment load transferred to the mounting base, selectively connected to said means for rigidly fixing the apparatus relative to an x-y plane and a z-axis perpendicular to the x-y plane; means for limiting at least one of the force load or moment load transferred to the sensor unit, selectively connected to said means for measuring at least one of a force load or a moment load transferred to the mounting base; and means for mounting the device under test to the apparatus so that any force or moment caused by a thrust or a drag from the device under test flows through the means for limiting to the means for measuring whereat the load is selectively measured, the means for mounting rigidly connected to said means for limiting at least one of the force load or moment load transferred to the means for measuring. Other embodiments of this aspect include corresponding computer systems, apparatus, and computer programs recorded on one or more computer storage devices, each configured to perform the actions of the methods.

One general aspect includes a sensor mount apparatus for measuring at least one property of a screw-fluid system or components thereof, the components including motors or generators, propellers or fans, the apparatus configurable for a specific device under test, the device under test including at least one screw-fluid system component, the apparatus including: a mounting base, for rigidly fixing the apparatus relative to an x-y plane and a z-axis perpendicular to the x-y plane; a sensor unit selectively connected to said mounting base, for measuring at least one of a force load or a moment load transferred to the mounting base; a load limiter selectively connected to sensor unit, for limiting at least one of the force load or moment load transferred to the sensor unit; and a mounting plate rigidly connected to said load limiter, for mounting the device under test to the apparatus so that any force or moment caused by a thrust or a drag from the device under test flows through the load limiter to the sensor unit whereat the load is selectively measured. Other embodiments of this aspect include corresponding computer systems, apparatus, and computer programs recorded on one or more computer storage devices, each configured to perform the actions of the 5 methods.

Implementations may include one or more of the following features. The sensor mount apparatus as recited where the sensor unit includes a plurality of load cell, for measuring bending towards or away from the z-axis or x-y plane, radially encompassing to said sensor unit, each load cell being selected from the group including bi-sectional load cell, and non-bi-sectional load cell. Implementations of the described techniques may include hardware, a method or 10 process, or computer software on a computer-accessible medium.

Other aspects and features of the present application will become apparent to those ordinarily skilled in the art upon review of a following description of specific embodiments of a apparatus and method for fluid-screw system property measurement in conjunction with the accompanying drawing figures.

BRIEF DESCRIPTION OF THE DRAWINGS

Embodiments of the present application will now be described, by way of example only, with reference to the accompanying drawing figures, wherein:

FIG. 3A is an exploded view of an example components of an open sensor mount;

FIG. 3B is a perspective view of an example open sensor mount;

FIG. 5A is an exploded view of an example components of an open sensor mount;

FIG. 5B is a perspective view of an example open sensor mount;

FIG. 5C is a perspective view of an example open sensor mount;

FIG. 8A is an exploded view of an example components of a device under test, sensor mount, and support component assembly;

FIG. 8B is a perspective view of an example device under test, sensor mount, and support component assembly;

FIG. 9A is an exploded view of example components of an enclosed sensor mount; and FIG. 9B is an exploded view of an example load limiter mounting fastener and a load limiter.

Like reference numerals are used in different figures to denote similar elements.

DETAILED DESCRIPTION OF THE DRAWINGS

Figure 1A:
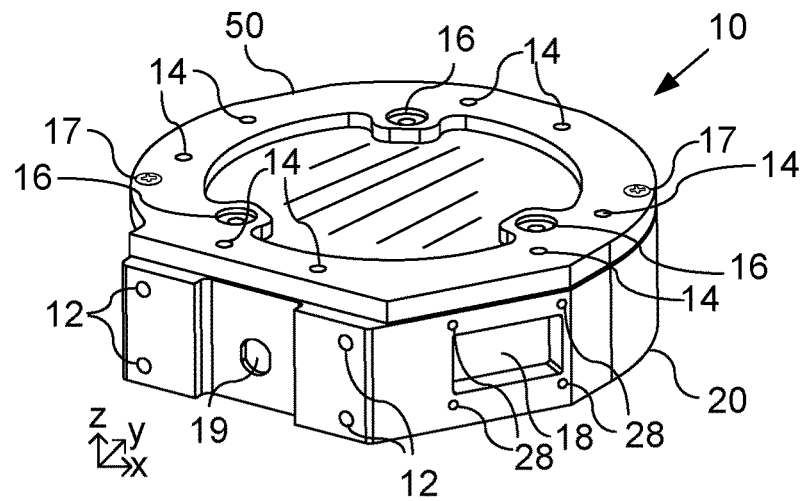
FIG. 1A is a perspective view of an example enclosed sensor mount.

Referring to the drawings, illustrated therein are the following elements which are referred to herein using their corresponding name and reference numeral used in the drawings, as follows:

sensor mount 10;
base support point 12;
device under test mounting point 14;
load limited mounting point 16;
failsafe fastener 17;
cable port 19;
mounting base 20;
rectangular cross-section 21;
failsafe mounting point 22;
base mounting point 24;
base fastener 26;
auxiliary mounting point 28;
sensor unit 30;
bi-sectional load cell 31;
load cell 32;
base mounting port 34;
load limiter mounting point 36;
central port 37;
radial directional cavity 38;
planar directional cavity 39;
load limiter 40;
load limiter mounting fastener 42;
load limiter base fastener 44;
hourglass shape 46;
mounting plate 50;
failsafe mounting port 52;
device under test fastener 54;
central load cell joiner 60;
load cell joiner mounting point 62;
joiner mounting port 64;
joiner fastener 66;
damping washer 72;
base damper 74;
mounting damper 76;
propeller 80;
motor/generator/bearing 82;
shaft 84;
device under test 90; and
support component 100.

Referring to the first sheet of the drawings, FIG. 1A is a perspective view of an example enclosed sensor mount. FIG. 1A identifies the following elements: enclosed sensor mount 10, base support point 12, device under test 25 mounting point 14, load limited mounting point 16, failsafe fastener 17, cable port 19, mounting base 20, auxiliary mounting point 28, and mounting plate 50. The example enclosed sensor mount 10 includes two main cooperating components, enclosed mounting base 20 and enclosed mounting plate 50, joined via load limiters (not shown in FIG. 1A) and via optional failsafe fastener 17. The example enclosed mounting base 20 as illustrated shows four base support point 12 for supporting the enclosed mounting base 20 rigidly relative to an illustrated x-y-z support reference frame, two cable port 19 for the passage of cables to the components inside of the enclosed sensor mount 10, and four auxiliary mounting point 28 for mounting auxiliary components to the enclosed sensor mount 10. The example enclosed mounting plate 50 includes eight device under test mounting point 14 for mounting a device under test (not shown in FIG. 1A), three load limited mounting point 16 for joining, via load limiters (not shown in FIG. 1A), with the mounting base 20. Advantageously, external force and torque applied onto enclosed mounting plate 50, such as for example via device under test mounting point 14, will flow through the load limited mounting point 16 before they can reach enclosed mounting base 20 and ultimately base support point 12 and any support component (not shown in FIG. 1A). Further advantageously, in the event that the external force or torque exceeds the capacity of at least one of the load limited mounting point 16, the failsafe fastener 17 keeps the enclosed mounting base 20 and enclosed mounting plate 50 moveably joined and the contents of the enclosed sensor mount 10 safely enclosed, since the failsafe fastener 17 is loosely fitted through a failsafe mounting port onto mounting plate 50 (not visible in FIG. 1A) and fastened to a failsafe mounting point (not visible in FIG. 1A) in the enclosed mounting base 20. Although not expressly shown in FIG. 1A, alternative embodiments by omission or addition are contemplated to be within the scope of this disclosure: For example, in alternative embodiments one or more of the failsafe fastener 17, cable port 19, or four auxiliary mounting point 28 are optional and not provided. Further still, in an alternative embodiment, enclosed sensor mount 10 is moveably sealed to ensure operation in water.

Figure 1B:
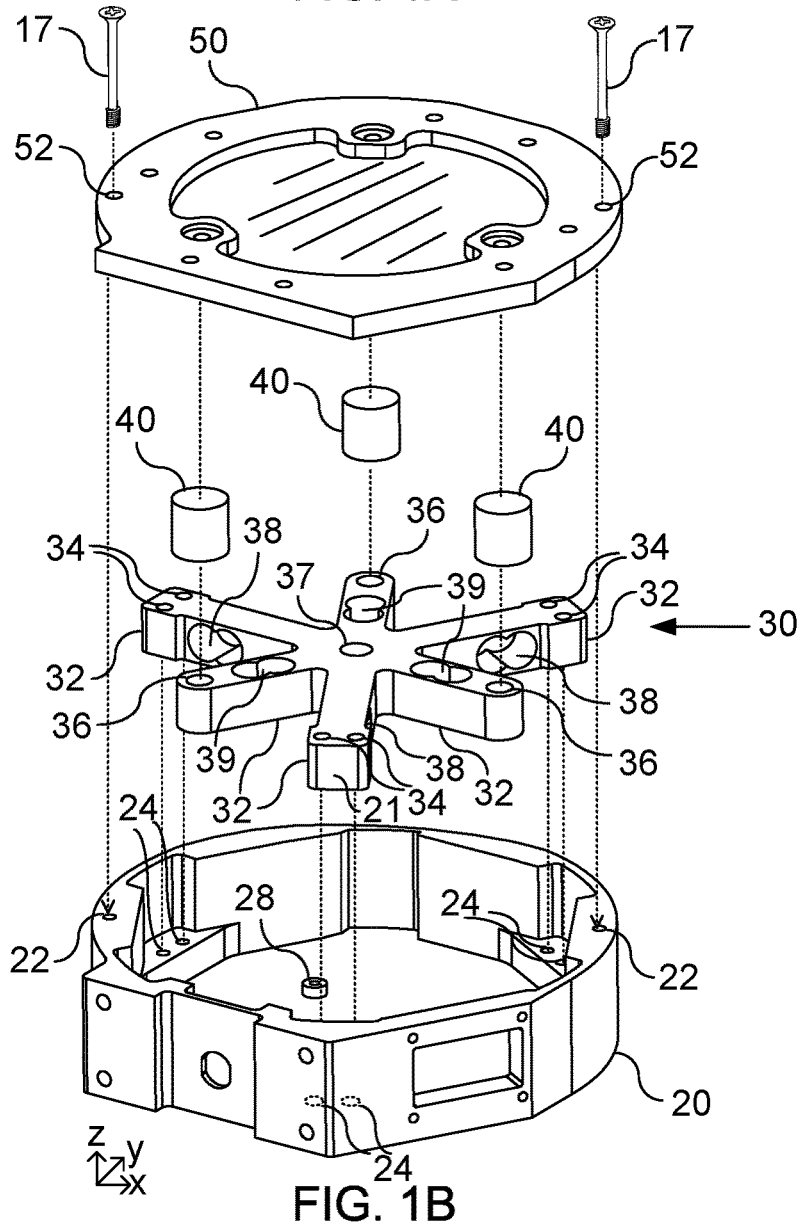
FIG. 1B is an exploded view of an example components of the enclosed sensor mount.

FIG. 1B is an exploded view of an example components of the enclosed sensor mount. FIG. 1B identifies the following elements: failsafe fastener 17, enclosed mounting base 20, rectangular cross-section 21, failsafe mounting point 22, base mounting point 24, auxiliary mounting point 28, mono-block sensor unit 30, load cell 32, base mounting port 34, load limiter mounting point 36, central port 37, radial directional cavity 38, planar directional cavity 39, load limiter 40, enclosed mounting plate 50, and failsafe mounting port 52. The functions of the mounting plate 50 are to allow mounting of the device under test and to transfer the force and torque generated by the device under test to the load limiter 40, as well as for mounting optional components such as an optical RPM probe, for example. The function of the load limiter 40 is to transfer the force and torque to the mono-block sensor unit 30 and to limit bending and torsion over non-measured axes. The function of the mono-block sensor unit 30 is to transfer the force and torque to the load cell 32. The mono-block sensor unit 30 illustrated includes six load cell 32, each having a rectangular cross-section 21, disposed in a radial configuration spaced at an angle of 60 degrees, alternating between load cell 32 having a radial directional cavity 38 and load cell 32 having a planar directional cavity 39. The load cell 32 having a radial directional cavity 38 are biased to favor bending towards or away from the z axis and used to sense forces along the z axis, such as thrust or drag generated by the device under test along the z axis. The load cell 32 having a planar directional cavity 39 are biased to favor torsion around the z axis, and used to sense circular forces or torque around the z axis. Although not expressly shown in the drawing, each load cell 32 has at least one electro-mechanical device attached thereto that can measure the deformation of the load cell 32. For example, a resistance that varies as a function of deformation can be placed on one or both of the external walls of the radial directional cavity 38 or planar directional cavity 39. Calibration may be required, and the components of all of the load cell 32 signals are combined to obtain sensor measurements over measured axes, in a straightforward manner by a person having ordinary skill in the art, without requiring undue experimentation. The function of the failsafe fastener 17, failsafe mounting port 52, and failsafe mounting point 22 can be more easily understood: the head of the failsafe fastener 17 abuts against the failsafe mounting port 52 and the threaded tip of failsafe fastener 17 engages with failsafe mounting point 22, while the smooth shaft of failsafe fastener 17 goes through failsafe mounting port 52 thereby enabling enclosed mounting plate 50 to have some degree of freedom relative to enclosed mounting base 20. Advantageously, regardless if one, both, or no failsafe fastener 17 are provided, external force and torque applied onto enclosed mounting plate 50, such as for example via device under test mounting point 14, will flow through the load limited mounting point 16 via load limiter 40, load limiter mounting point 36, load cell 32, mono-block sensor unit 30, base mounting port 34, and base mounting point 24 to reach enclosed mounting base 20 and ultimately one or more base support point and any support component (not shown in FIG. 1A). Further advantageously, if one or both failsafe fastener 17 are provided, and external force or torque applied onto enclosed mounting plate 50, such as for example via device under test mounting point 14, flow through the load limited mounting point 16 via load limiter 40 and exceed the capacity of any component, and in particular load limiter 40, failsafe fastener 17 keeps the enclosed mounting plate 50 joined with mounting base 20 so that enclosed sensor mount 10 protects the contents enclosed therein, including sensor unit 30, and any auxiliary and device under test components (not shown in FIG. 1B) connected to a support component (not shown in FIG. 1B). The function of central port 37, is to enable cables or shafts to pass through, and in alternative embodiments, it is not provided. The load cell 32 and mono-block sensor unit 30 can be made of any suitable metal, such as for example, aluminium or steel, depending on the force and torque requirements of a given application, as can be determined in a straightforward way by a person having ordinary skill in the art, without undue experimentation.

Figure 2A:
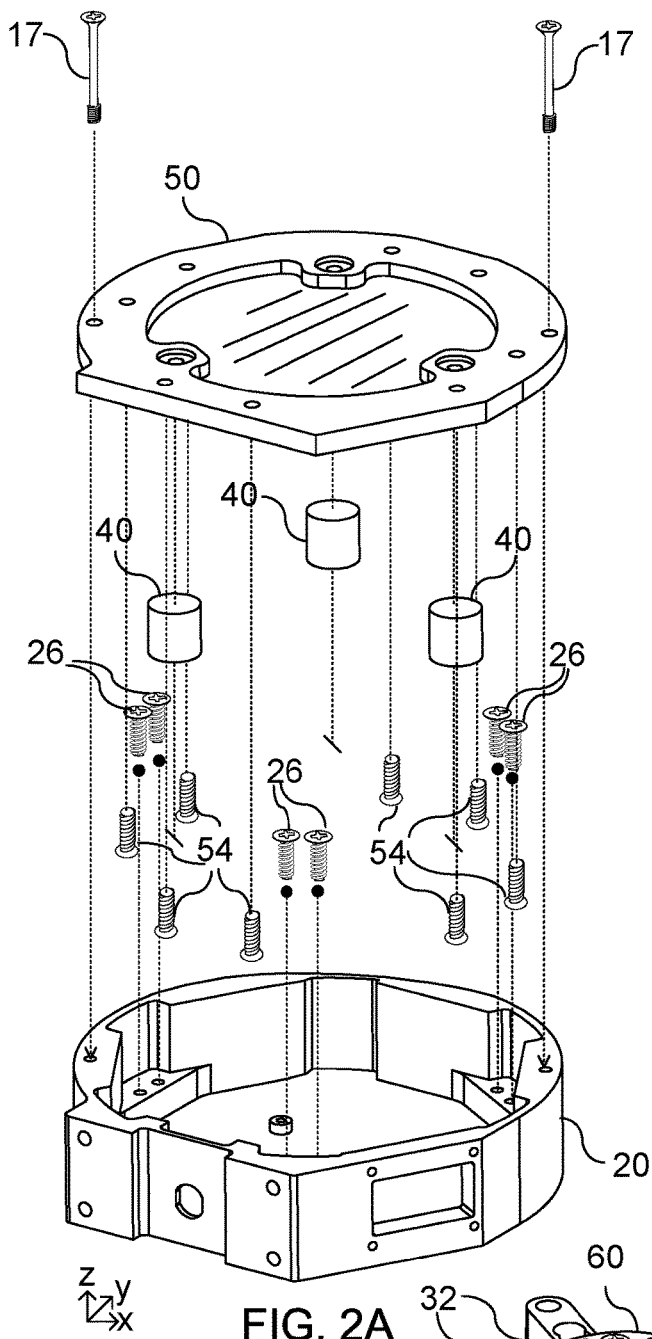
FIG. 2A is an exploded view of example components of an enclosed sensor mount.

Referring to the second sheet of the drawings, FIG. 2A is an exploded view of example components of an enclosed sensor mount. FIG. 2A identifies the following elements: failsafe fastener 17, enclosed mounting base 20, base fastener 26, load limiter 40, enclosed mounting plate 50, and device under test fastener 54. A sensor unit is not shown in FIG. 2A to facilitate the illustration of other elements shown and to facilitate the description of the function of those elements. The function of the failsafe fastener 17, enclosed mounting base 20, load limiter 40, and enclosed mounting plate 50 are substantially as already described. The function of the device under test fastener 54 is to releasably and rigidly mount a device under test (not shown in FIG. 2A), to the enclosed mounting plate 50, whereas the function of the base fastener 26 is to releasably and rigidly mount a sensor unit to the enclosed mounting base 20. Thus, it is clear that, in absence of any transfer through the failsafe fastener 17, force and torque of interest generated by a device under test rigidly mounted mounting plate 50 and the enclosed mounting base 20 can only be transferred via the three load limiter 40 to the mounting base if and only a load sensor unit is present. Furthermore, it follows that any force and torque of interest, will necessarily and advantageously have to transfer through the load sensor unit.

Figure 2B:
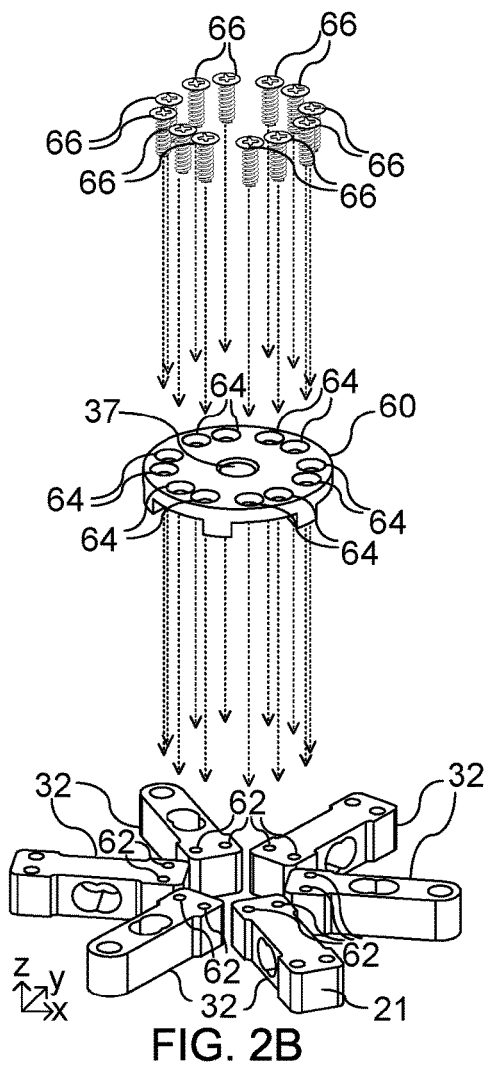
FIG. 2B is an exploded view of an example components of a centrally joined sensor unit.

FIG. 2B is an exploded view of an example components of a centrally joined sensor unit. FIG. 2B identifies the following elements: rectangular cross-section 21, load cell 32, central port 37, central load cell joiner 60, load cell joiner mounting point 62, joiner mounting port 64, and joiner fastener 66. The function of the rectangular cross-section 21, load cell 32, central port 37 are substantially as already described. However, as compared with the load cell of the mono-block sensor unit, the load cell 32 of a centrally joined sensor unit all have two load cell joiner mounting point 62 for receiving respective joiner fastener 66. Each joiner fastener 66 goes through a respective joiner mounting port 64 of the central load cell joiner 60, which as illustrated, includes central port 37. Advantageously, should any single load cell 32 fail, only that load cell 32 need be replaced. The load cell 32 and central load cell joiner 60 can be made of any suitable metal, such as for example, aluminium or steel, depending on the force and torque requirements of a given application, as can be determined in a straightforward way by a person having ordinary skill in the art, without undue experimentation.

Figure 2C:
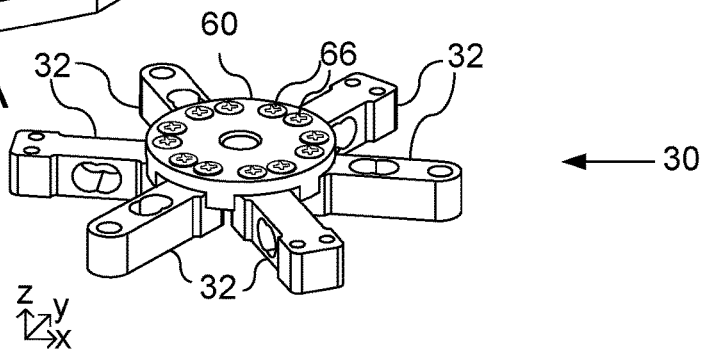
FIG. 2C is a perspective view of an example centrally joined sensor unit.

FIG. 2C is a perspective view of an example centrally joined sensor unit. FIG. 2c identifies the following elements: centrally joined sensor unit 30, load cell 32, central load cell joiner 60, and joiner fastener 66. These elements function substantially as already described. The centrally joined sensor unit 30 is functionally equivalent to the mono-block sensor unit 30 illustrated in FIGS. 1A and 1B, with the advantage of enabling maintenance of individual load cell 32.

Referring to the third sheet of the drawings, FIG. 3A is an exploded view of an example components of an open sensor mount. FIG. 3A identifies the following elements: base support point 12, device under test mounting point 14, load limited mounting point 16, cable port 19, open mounting base 20, rectangular cross-section 21, base mounting point 24, base fastener 26, auxiliary mounting point 28, bi-sectional load cell 31, base mounting port 34, central port 37, radial directional cavity 38, planar directional cavity 39, load limiter 40, and open mounting plate 50. The function of the base support point 12, device under test mounting point 14, load limited mounting point 16, cable port 19, rectangular cross-section 21, base mounting point 24, base fastener 26, auxiliary mounting point 28, base mounting port 34, central port 37, radial directional cavity 38, planar directional cavity 39, and load limiter 40 are substantially as already described. The function of the open mounting base 20 and open mounting plate 50 is identical to that of the already described enclosed mounting base and enclosed mounting plate, except that there is no enclosure feature, and there are half as many base mounting point 24, base fastener 26 required due to the use of the three bi-sectional load cell 31 disposed radially 120 degrees apart, each having both radial directional cavity 38, planar directional cavity 39, instead of six load cell, each having only one of each type of cavity. Furthermore, the open mounting base 20 takes on a similar role to the central load cell joiner such that when assembled using the six base fastener 26, the resulting assembly is functionally equivalent to a sensor unit.

FIG. 3B is a perspective view of an example open sensor mount. FIG. 3B identifies the following elements: open sensor mount 10, base support point 12, device under test mounting point 14, load limited mounting point 16, open mounting base 20, bi-sectional load cell 31, load limiter 40, and open mounting plate 50. These elements function substantially as already described, with the exception of open sensor mount 10, which is functionally equivalent to enclosed open sensor mount, without the enclosing functionality.

Figure 4A:
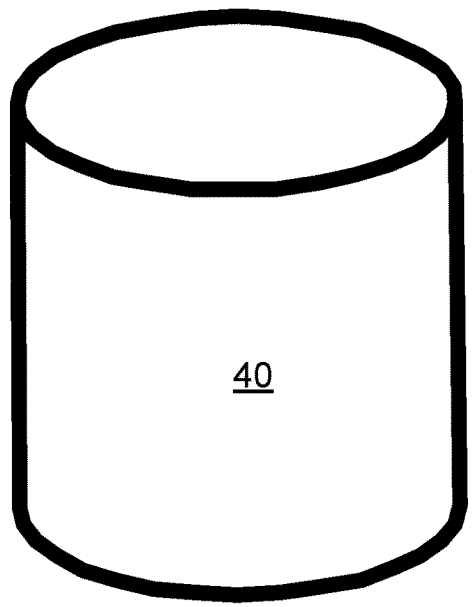
FIG. 4A is a perspective view of an example cylindrical load limiter.

Referring to the fourth sheet of the drawings, FIG. 4A is a perspective view of an example cylindrical load limiter. The illustrated cylindrical load limiter 40 could be provided, for example, by a spacer, or damper. Although this kind of load limiter 40 has been illustrated in all previously described drawings, it is contemplated that in alternative embodiments, different kinds of load limiter can be used in all the examples, such as those illustrated, but not limited to, the example load limiters of FIGS. 4B, 4C and 4D.

Figure 4B:
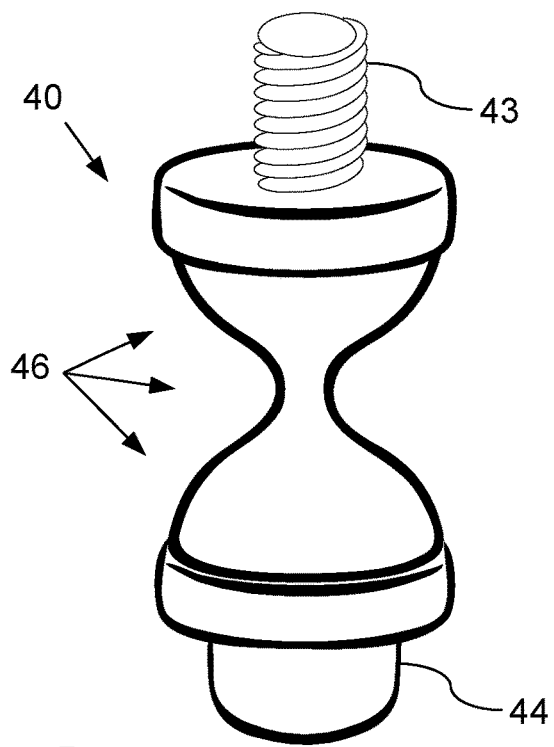
FIG. 4B is a perspective view of an example hourglass shape load limiter.

FIG. 4B is a perspective view of an example hourglass shape load limiter. FIG. 4B identifies the following elements: hourglass shape load limiter 40, load limiter mounting fastener 42, load limiter base fastener 44, and hourglass shape 46. The function of hourglass shape load limiter 40 is substantially the same as what has already been described in relation to load limiter. However, the specific function of the hourglass shape 46 is to further limit the transfer of force and torque in non-measured axes. The function of the load limiter mounting fastener 42 is to connect with a corresponding load limited mounting point of a mounting plate whereas the function of the load limiter base fastener 44 is to connect with a corresponding load limiter mounting point of a sensor unit, bi-sectional load cell, or load cell.

Figure 4C:
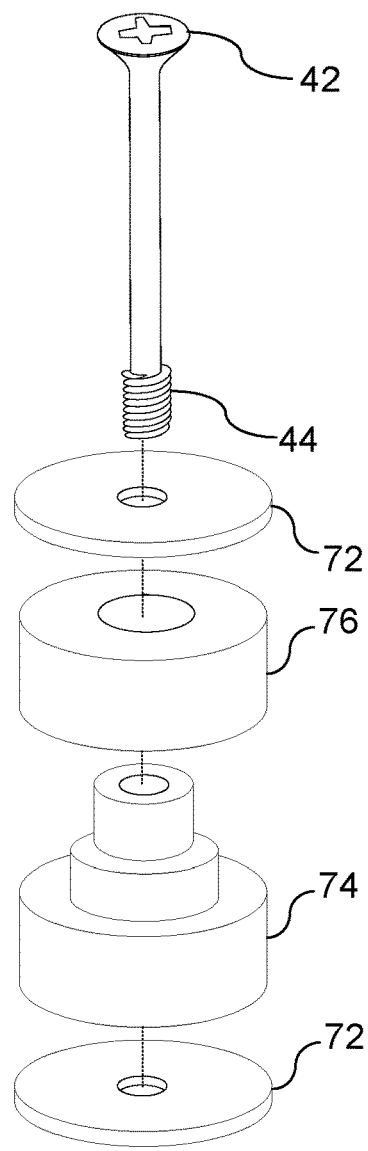
FIG. 4C is an exploded view of an example components of a dampening load limiter.

FIG. 4C is an exploded view of an example components of a dampening load limiter. FIG. 4C identifies the following elements: failsafe fastener 17, load limiter mounting fastener 42, load limiter base fastener 44, damping washer 72, base damper 74, and mounting damper 76. The function of the failsafe fastener 17, load limiter mounting fastener 42, load limiter base fastener 44 are substantially as already described except that the failsafe fastener 17 is used to provide the load limiter mounting fastener 42 at one end and the load limiter base fastener 44 at the other end, the failsafe fastener 17 passing through central openings of the damping washer 72, base damper 74, and mounting damper 76. The functions of the pair of damping washer 72 are to provide pressure towards the base damper 74 and the mounting damper 76 respectively, and to provide fastening force. The function of the base damper 74 and mounting damper 76 are to transfer force and torque in measured axes to the sensor unit, bi-sectional load cell, or load cell while absorbing bending, torsion and vibration in non-measured axes.

Figure 4D:
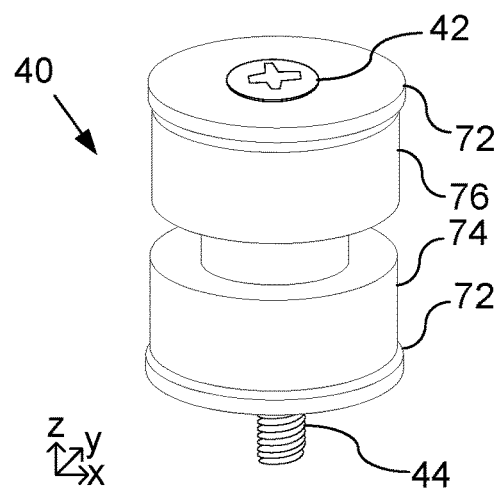
FIG. 4D is a perspective view of an example dampening load limiter.

FIG. 4D is a perspective view of an example dampening load limiter. FIG. 4D identifies the following elements: dampening load limiter 40, load limiter mounting fastener 42, load limiter base fastener 44, damping washer 72, base damper 74, and mounting damper 76. These elements function substantially as already described.

Referring to the fifth sheet of the drawings, FIG. 5A is an exploded view of an example components of an open sensor mount. FIG. 5B is a perspective view of an example open sensor mount. FIG. 5C is a perspective view of an example open sensor mount. FIGS. 5A, 5B and 5C identify elements already identified in FIGS. 3A and 4C. FIGS. 5A and 5B illustrate how a dampening load limiter 40 and its components can be used instead of a cylindrical load limiter. FIGS. 5C illustrates an alternative embodiment using a dampening load limiter 40 wherein the open mounting base 20 can be placed between the bi-sectional load cell 31 and the open mounting plate 50.

Figure 6:
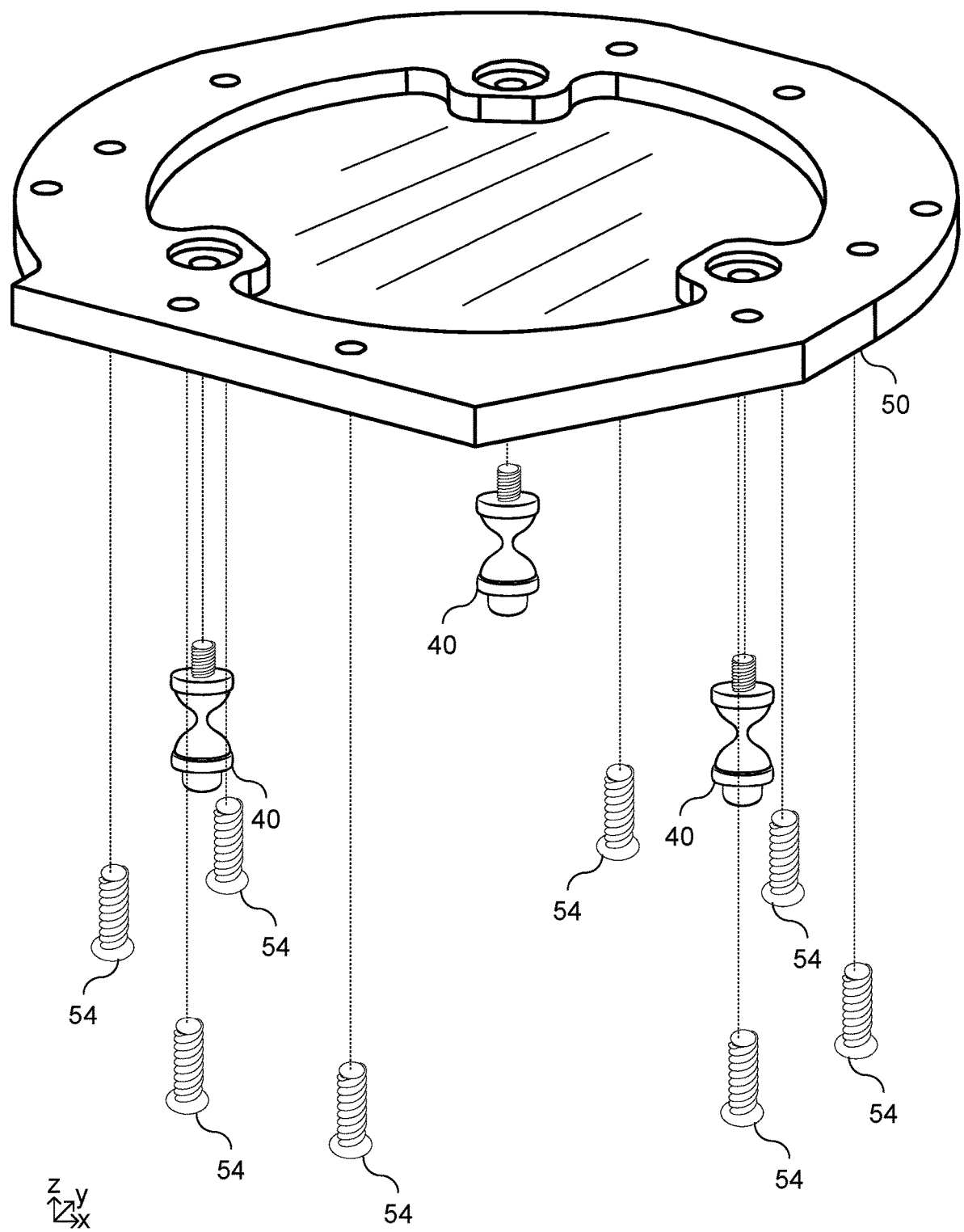
FIG. 6 is an exploded view of an example components of an example enclosed sensor mount.

Referring to the sixth sheet of the drawings, FIG. 6 is an exploded view of an example components of an example enclosed sensor mount. FIG. 6 identifies elements that have been previously described and shows how the hourglass shape load limiter 40 can be used instead of a cylindrical load limiter, and how device under test fastener 54 can be used to mount a device under test onto an enclosed mounting plate 50 before closing an enclosed sensor mount.

Figure 7A:
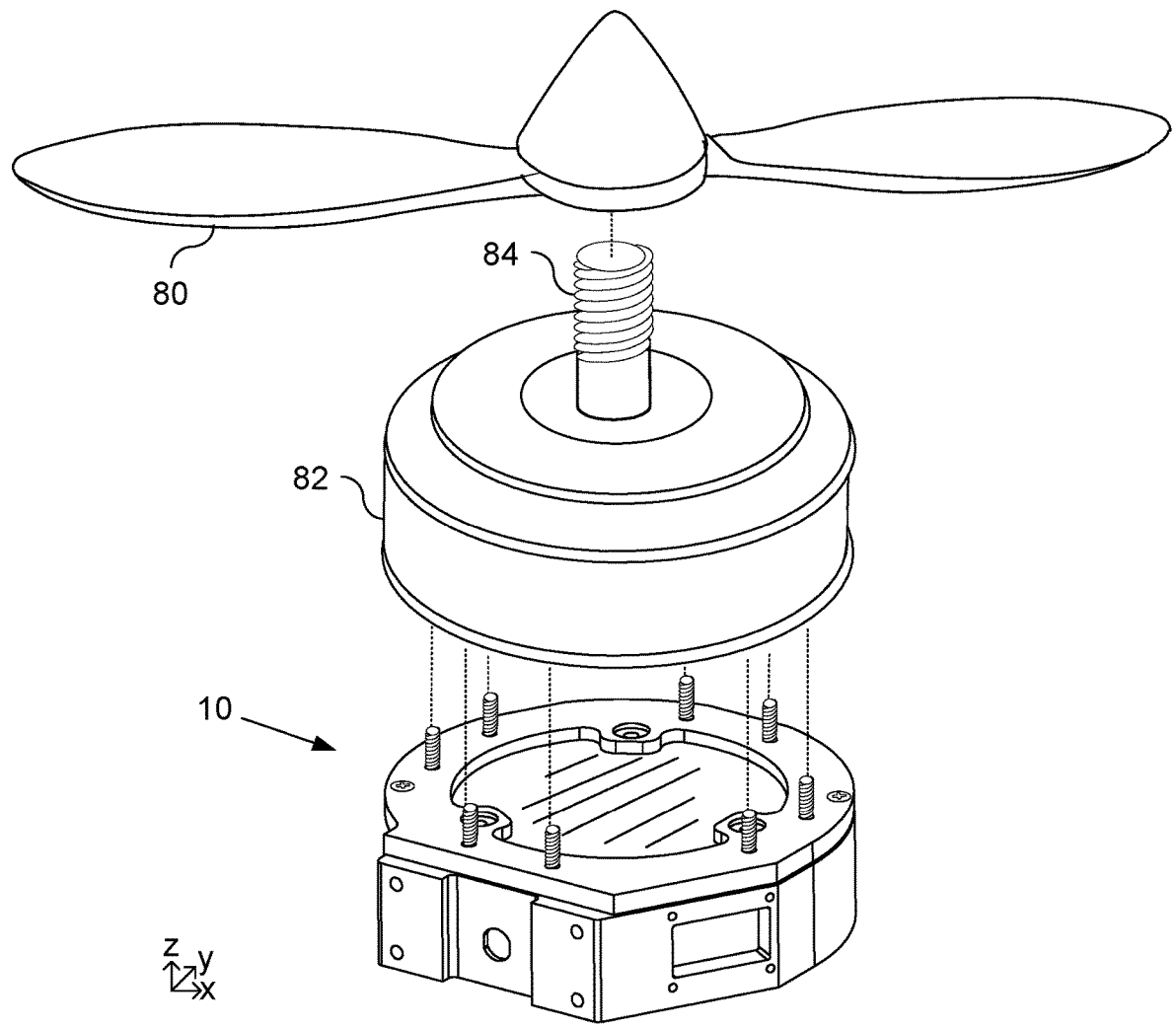
FIG. 7A is an exploded view of an example components of a device under test and sensor mount assembly.
Figure 7B:
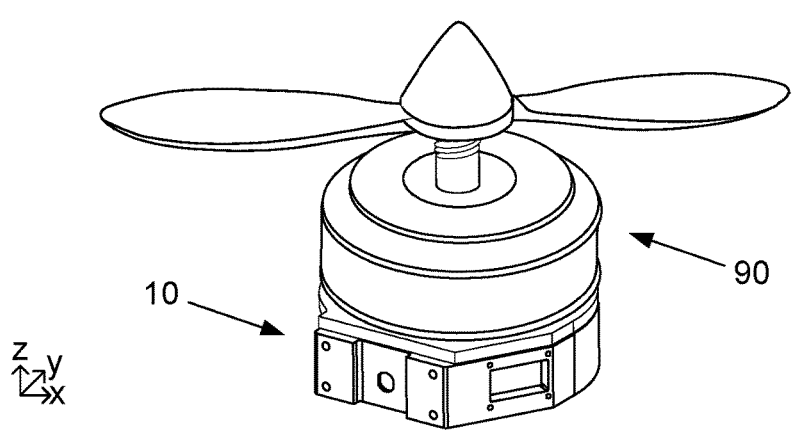
FIG. 7B is a perspective view of an example device under test and sensor mount assembly.

Referring to the seventh sheet of the drawings, FIG. 7A is an exploded view of an example components of a device under test and sensor mount assembly. FIG. 7B is a perspective view of an example device under test and sensor mount assembly. FIGS. 7A and 7B identify the following elements enclosed sensor mount 10, propeller 80, motor/generator/bearing 82, shaft 84, and device under test 90. The function of the enclosed sensor mount 10 is substantially as already described. The function of propeller 80, motor/generator/bearing 82, and shaft 84 are to combine to provide a device under test 90 that can be mounted on the enclosed sensor mount 10. The function of the motor/generator/bearing 82 is to enable thrust or drag at the propeller 80, as well as torque at shaft 84, to be transferred to the enclosed sensor mount 10. When the motor/generator/bearing 82 is a motor, the motor spins shaft 84, which causes the propeller 80 to spin thereby transferring thrust and torque to the enclosed sensor mount 10. When the motor/generator/bearing 82 is a generator or a bearing, fluid flow, such as water or air, causes the propeller 80 to spin thereby transferring drag and torque to the enclosed sensor mount 10. When a bearing is used, the propeller 80 is the main component of the device under test 90, whereas when a motor or generator are used, it is the combination of propeller 80 and motor or generator that are the main component of the device under test 90.

Referring to the eighth sheet of the drawings, FIG. 8A is an exploded view of an example components of a device under test, sensor mount, and support component assembly. FIG. 8B is a perspective view of an example device under test, sensor mount, and support component assembly. FIGS. 8A and 8B identify the following elements: sensor mount 10, device under test 90, and support component 100. The support component 100 supports the sensor mount 10, onto which is mounted the device under test 90. Advantageously, as compared to mounting the device under test 90 directly onto support component 100, the sensor mount 10 enables the measurement of at least one of thrust, drag, and torque generated by the device under test 90. Although not expressly shown in the drawings, it is contemplate that the support component 100 is any one of a number of existing screw-fluid systems such that at least one property of these systems can not only be tested in a controlled environment, but also integrated into the existing screw-fluid system so as to enhance its operation in the field.

The above-described embodiments of the present application are intended to be examples only. Those of skill in the art may affect alterations, modifications and variations to the particular embodiments without departing from the scope of the invention, which is set forth in the claims.

What is claimed is:

1. A sensor mount apparatus for measuring at least one property of a screw-fluid system or components thereof, the components including motors, generators, bearings, shafts, propellers or fans, the apparatus configurable for a specific device under test, the device under test including at least one screw-fluid system component, the apparatus comprising:
    means for rigidly fixing the apparatus relative to an x-y plane and a z-axis perpendicular to the x-y plane;
    means for measuring at least one of a force load or a moment load transferred to the mounting base, selectively connected to said means for rigidly fixing the apparatus relative to an x-y plane and a z-axis perpendicular to the x-y plane;
    means for limiting at least one of the force load or moment load transferred to the sensor unit, selectively connected to said means for measuring at least one of a force load or a moment load transferred to the mounting base; and
    means for mounting the device under test to the apparatus so that any force or moment caused by a thrust or a drag from the device under test flows through the means for limiting to the means for measuring, whereat the load is selectively measured, the means for mounting rigidly connected to said means for limiting at least one of the force load or moment load transferred to the means for measuring.

2. The sensor mount apparatus in accordance with claim 1, wherein said means for rigidly fixing the apparatus relative to an x-y plane and a z-axis perpendicular to the x-y plane comprises a mounting base.

3. The sensor mount apparatus in accordance with claim 1, wherein said means for measuring at least one of a force load or a moment load transferred to the mounting base comprises a sensor unit.

4. The sensor mount apparatus in accordance with claim 1, wherein said means for limiting at least one of the force load or moment load transferred to the sensor unit comprises a load limiter.

5. The sensor mount apparatus in accordance with claim 1, wherein said means for mounting the device under test to the apparatus comprises a mounting plate.

6. A system of one or more computers configured to perform particular operations or actions by virtue of having software, firmware, hardware, or a combination of them installed on the system that in operation causes or cause the system to perform the actions, the system comprising:
    the sensor mount apparatus of claim 1 and
    one or more computer programs configured to perform particular operations or actions by virtue of including instructions that, when executed by data processing apparatus, cause the apparatus to perform the actions using the sensor mount apparatus of claim 1.

7. A sensor mount apparatus for measuring at least one property of a screw-fluid system or components thereof, the components including motors or generators, propellers or fans, the apparatus configurable for a specific device under test, the device under test including at least one screw-fluid system component, the apparatus comprising: a mounting base, for rigidly fixing the apparatus relative to an x-y plane and a z-axis perpendicular to the x-y plane; a sensor unit selectively connected to said mounting base, for measuring at least one of a force load or a moment load transferred to the mounting base; a load limiter selectively connected to sensor unit, for limiting at least one of the force load or moment load transferred to the sensor unit; and a mounting plate rigidly connected to said load limiter, for mounting the device under test to the apparatus so that any force or moment caused by a thrust or a drag from the device under test flows through the load limiter to the sensor unit whereat the load is selectively measured.

8. The sensor mount apparatus as recited in claim 7, further comprising a device under test mounting point, for mounting the device under test to the mounting plate, specifically provided to said mounting plate.

9. The sensor mount apparatus as recited in claim 7, further comprising a load limited mounting point, for mounting the load limiter, specifically provided to said mounting plate.

10. The sensor mount apparatus as recited in claim 7, further comprising a load limiter mounting fastener, and a load limiter base fastener, for mounting the load limiter.

11. The sensor mount apparatus as recited in claim 7, wherein the sensor unit comprises a plurality of load cell, for measuring bending towards or away from the z-axis or x-y plane, radially encompassing to said sensor unit, each load cell being selected from the group including bi-sectional load cell, and non-bi-sectional load cell.

12. The sensor mount apparatus as recited in claim 11, wherein the plurality of load cell are directional load cell, each having at least one directional cavity selected from the group of radial directional cavity and planar directional cavity.

13. The sensor mount apparatus as recited in claim 11, further comprising a central load cell joiner, the central load cell joiner connecting the plurality of load cell via load cell joiner mounting point and joiner fastener.

14. The sensor mount apparatus as recited in claim 11, further comprising a plurality of base mounting port, for transferring the load to the mounting base, selectively provided to said plurality of load cell.

15. The sensor mount apparatus as recited in claim 11, further comprising a base mounting point, for receiving a base fastener that cooperates with a corresponding base mounting port of the load cell, specifically provided to said mounting base.

16. The sensor mount apparatus as recited in claim 11, wherein the plurality of load cell have a rectangular cross-section.

17. The sensor mount apparatus as recited in claim 11, further comprising a load limiter mounting point, for receiving a load from the load limiter, selectively provided to said load cell.

18. The sensor mount apparatus as recited in claim 11, further comprising a base mounting point, for receiving a base fastener that cooperates with a corresponding base mounting port of the load cell, specifically provided to said mounting base.

19. The sensor mount apparatus as recited in claim 11, further comprising a base mounting port, for transferring the load to the mounting base, selectively provided to said load cell.

20. The sensor mount apparatus as recited in claim 11, wherein the load limiter comprises at least one fastener selected from the group of a load limiter mounting fastener, and a load limiter base fastener.

21. The sensor mount apparatus as recited in claim 11, wherein the load limiter comprises a damping washer, a base damper, and a mounting damper.

22. The sensor mount apparatus as recited in claim 11, wherein the load limiter comprises a standoff.

23. The sensor mount apparatus as recited in claim 11, wherein the load limiter comprises an hourglass shape.

24. The sensor mount apparatus as recited in claim 7, wherein the mounting base includes at least one base support point to support the base onto at least one support component.

25. The sensor mount apparatus as recited in claim 7, wherein the mounting base includes at least one auxiliary mounting point for mounting at least one auxiliary component.

26. The sensor mount apparatus as recited in claim 7, further comprising a central port for receiving at least one central component.

27. The sensor mount apparatus as recited in claim 7, further comprising a cable port for receiving at least one cable.

28. The sensor mount apparatus as recited in claim 7, further comprising at least one device under test fastener for mounting the device under test to the mounting plate.

29. The sensor mount apparatus as recited in claim 7, further comprising at least one failsafe mounting point, at least one failsafe mounting port, and at least one failsafe fastener for securing the base plate to the mounting plate in the event of a failure of the load limiter.

* * * * *